(12) United States Patent  (10) Patent No.: US 8,061,679 B2
Lord  (45) Date of Patent: Nov. 22, 2011

(54) LAPTOP COOLING STAND

(75) Inventor: Charles Lord, Scottsdale, AZ (US)

(73) Assignee: Hotwire Development, LLC, Scottsdale, AZ (US)

( * ) Notice: Subject to any disclaimer, the term of this patent is extended or adjusted under 35 U.S.C. 154(b) by 46 days.

(21) Appl. No.: 12/380,197

(22) Filed: Feb. 25, 2009

(65) Prior Publication Data

US 2009/0212180 A1  Aug. 27, 2009

Related U.S. Application Data

(60) Provisional application No. 61/066,948, filed on Feb. 25, 2008.

(51) Int. Cl.
*F16M 1/00* (2006.01)
(52) U.S. Cl. ............... 248/678; 248/346.01; 361/679.55
(58) Field of Classification Search .................. 248/678, 248/346.5, 346.01; 361/679.55, 679.56
See application file for complete search history.

(56) References Cited

U.S. PATENT DOCUMENTS

| | | | |
|---|---|---|---|
| 3,790,115 A * | 2/1974 | Fox et al. ....................... | 248/679 |
| 5,143,341 A | 9/1992 | Juster | |
| 5,616,897 A | 4/1997 | Weber et al. | |
| 5,732,910 A | 3/1998 | Martin | |
| 5,893,540 A | 4/1999 | Scott | |
| 5,927,669 A | 7/1999 | Sassman | |
| 6,003,446 A | 12/1999 | Leibowitz | |
| 6,234,085 B1 | 5/2001 | Ramundo | |
| 6,305,652 B1 | 10/2001 | Borke et al. | |
| 6,353,530 B1 | 3/2002 | Zarek et al. | |
| 6,353,536 B1 | 3/2002 | Nakamura et al. | |
| 6,527,241 B1 | 3/2003 | Lord | |
| D475,057 S * | 5/2003 | Lord ........................... | D14/447 |
| 6,568,650 B2 | 5/2003 | Helmetsie et al. | |
| 6,682,040 B1 | 1/2004 | MacEachem | |
| 7,035,100 B2 * | 4/2006 | Lord ....................... | 361/679.41 |
| 7,121,214 B1 | 10/2006 | Taltzman et al. | |
| 7,161,799 B2 | 1/2007 | Lim et al. | |
| D554,135 S | 10/2007 | Lim et al. | |
| 7,322,063 B2 | 1/2008 | Esimai | |
| 7,327,560 B1 | 2/2008 | Tabasso et al. | |
| 7,359,184 B2 | 4/2008 | Lord | |
| D578,130 S | 10/2008 | Sween et al. | |
| D579,455 S | 10/2008 | Chu | |
| 2006/0285283 A1 | 12/2006 | Simonian et al. | |
| 2007/0258206 A1 | 11/2007 | Huang | |
| 2008/0029684 A1 | 2/2008 | Rowland | |
| 2008/0061207 A1 | 3/2008 | Panziera et al. | |

FOREIGN PATENT DOCUMENTS

| | | |
|---|---|---|
| DE | 82 10 589 U1 | 8/1982 |
| DE | 199 52 277 A1 | 5/2001 |
| DE | 20 2005 017 227 U1 | 3/2006 |
| EP | 0 859 305 A2 | 8/1998 |
| EP | 1 531 485 A1 | 5/2005 |
| EP | 1 513 045 A2 | 9/2005 |
| WO | WO 98/34851 | 8/1998 |

(Continued)

OTHER PUBLICATIONS

EPO Search Report, Apr. 30, 2009, Charles Lord.

(Continued)

*Primary Examiner* — Terrell McKinnon
*Assistant Examiner* — Bradley Duckworth
(74) *Attorney, Agent, or Firm* — Robert C. Klinger

(57) ABSTRACT

The present invention is directed to a notebook/laptop computer stand adapted to support a notebook/laptop computer and having a recessed surface area portion to sufficiently cool the computer while situated thereon.

20 Claims, 3 Drawing Sheets

FOREIGN PATENT DOCUMENTS

WO          WO 01/66358 A1     9/2001
WO          WO 2004/104803 A2     2/2004

OTHER PUBLICATIONS

EPO Written Opinion, Apr. 30, 2009, Charles Lord.
EPO Search Report, Apr. 6, 2009, Lord.
EPO Written Opinion, Apr. 6, 2009, Lord.
Targus Chill Mat—Quick Start Instruction Sheet—Targus Group International; Jan. 2007, pp. 1-2, XP -002529112—Figure 4.
Tiffany Boggs; "Belkin Laptop Cooling Pad/Stand Review", Oct. 9, 2007, pp. 1-5, XP 002529113.

\* cited by examiner

LAPTOP COOLING STAND

CLAIM OF PRIORITY

This application claims priority of U.S. Provisional Patent Application Ser. No. 61/066,948, entitled "LAPTOP COOLING STAND", filed Feb. 25, 2008, the teachings of which are incorporated herein by reference.

FIELD OF THE INVENTION

The present invention is generally related to notebook computer accessories, and more particularly to notebook/laptop ergonomic stands including cooling mechanisms.

BACKGROUND OF THE INVENTION

Notebook/laptop computer stands are desired to ergonomically support a notebook/laptop computer, and also provide suitable cooling for same when supported thereon. Structural integrity, as well as aesthetic designs are important in such stands.

Notebook/laptop computers generate a significant amount of heat during operation, particularly due to the electronics operating in a very confined housing. The bottom surface of these computers generate an uncomfortable amount of heat when situated upon the lap of the user which bottom surface need ambient air to suitable cool the surface. A variety of notebook/laptop computer stands are available on the market that include fans to direct air flow thereupon to increase the thermal cooling thereof.

It is important to users to have a notebook stand that can provide both suitable cooling to a supported notebook/laptop computer, structural integrity, ergonomic design, and also an aesthetic design.

SUMMARY OF INVENTION

The present invention is directed to a Notebook/Laptop Computer Stand adapted to support a Notebook/Laptop Computer and having a recessed surface area portion to sufficiently cool the Computer while situated thereon.

DETAILED DESCRIPTION OF THE PREFERRED EMBODIMENT

Figure 1:
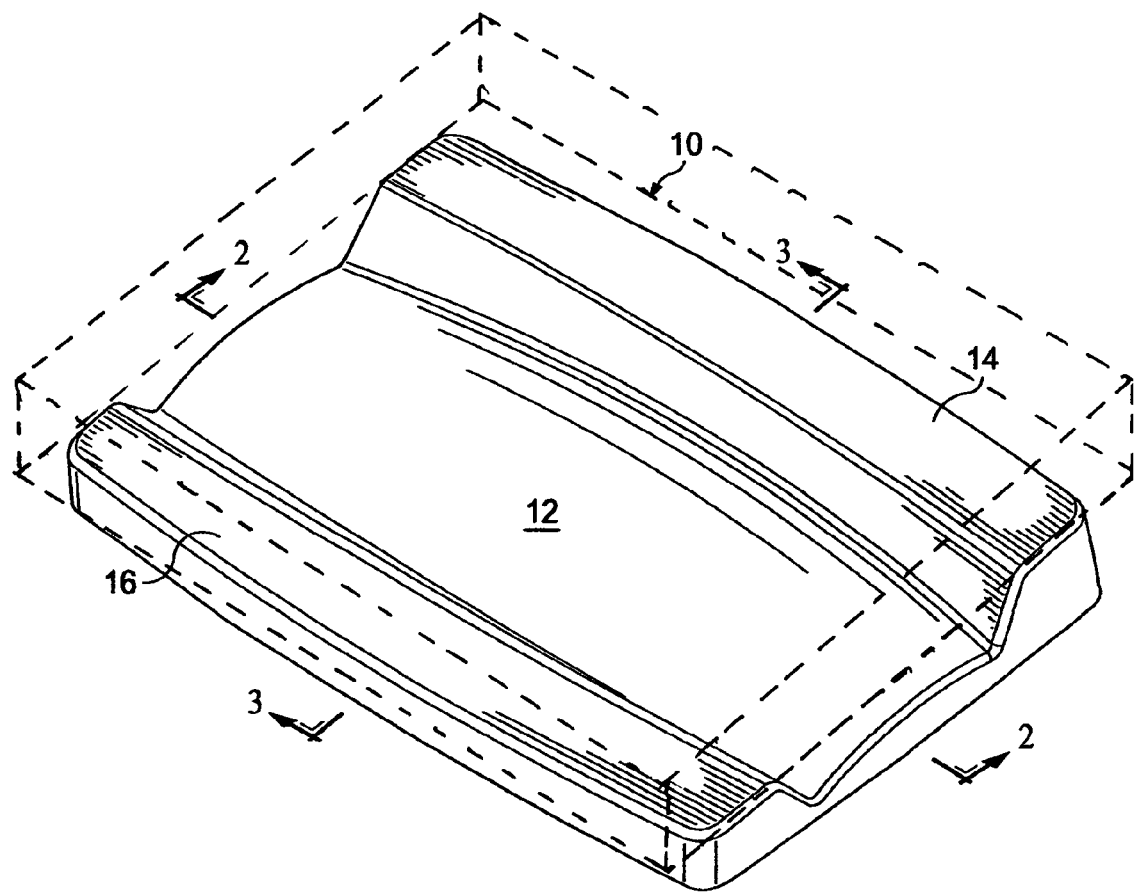
FIG. 1 is a perspective view of a first embodiment of the present invention.
Figure 2:
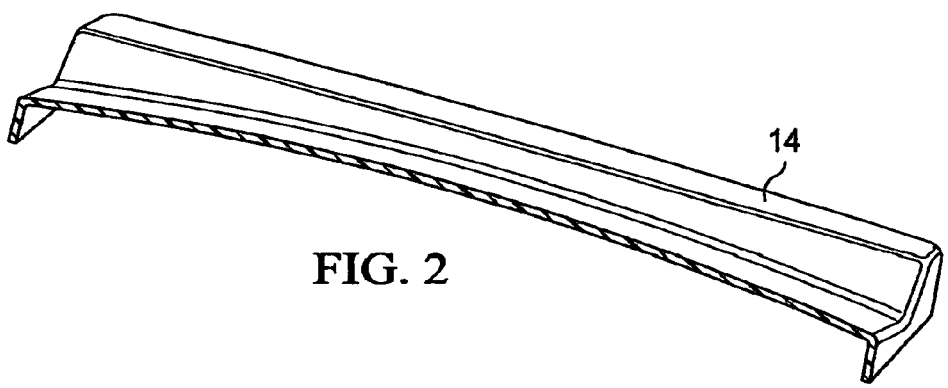
FIG. 2 shows a longitudinal cross-section taken along line 1-1 in FIG. 1.
Figure 3:
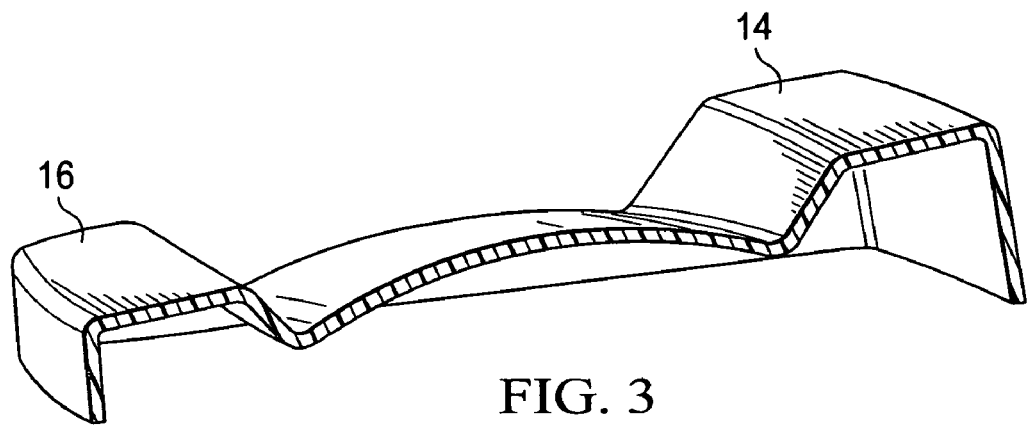
FIG. 3 shows a cross-section line 2-2 in FIG. 1.

FIG. 1 shows a perspective top view of a notebook/laptop computer cooling stand 10 according to one preferred embodiment of the present invention. FIG. 2 shows a longitudinal cross section taken along line 1-1 of FIG. 1, and FIG. 3 of the drawings shows a cross section view taken along line 2-2 of FIG. 1. Notably, the midsection area 12 of the computer support stand 10 is shaped as a saddle, wherein the recessed portion of the notebook stand extending between the raised ends is bowed outwardly in both the lateral and longitudinal directions. Advantageously, one end 14 of the stand 10 rises higher than the other end 16 such that a notebook computer supported thereon is angled with respect to the surface supporting the stand. This design provides both a recessed surface below the notebook computer bottom surface, as well as an ascetically pleasing appearance. This midsection 12 has a generally saddle shape which can be created by a single mold during tooling.

Figure 4:
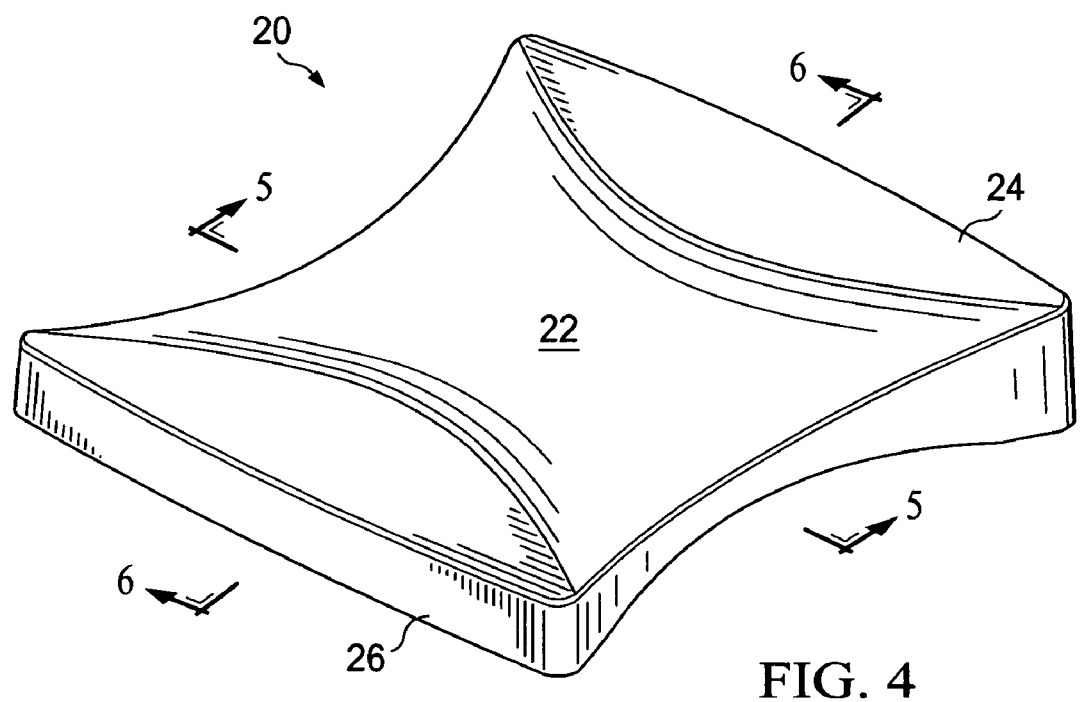
FIG. 4 shows a perspective view of a second preferred embodiment of the invention.
Figure 5:
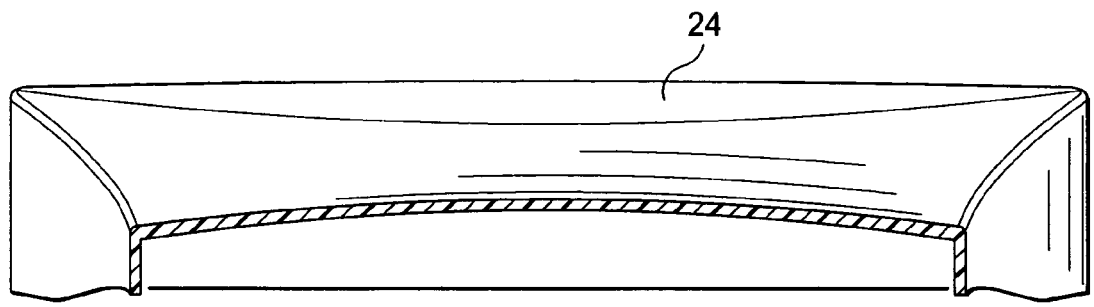
FIG. 5 shows a cross-section taken along line 1-1 in FIG. 4.
Figure 6:
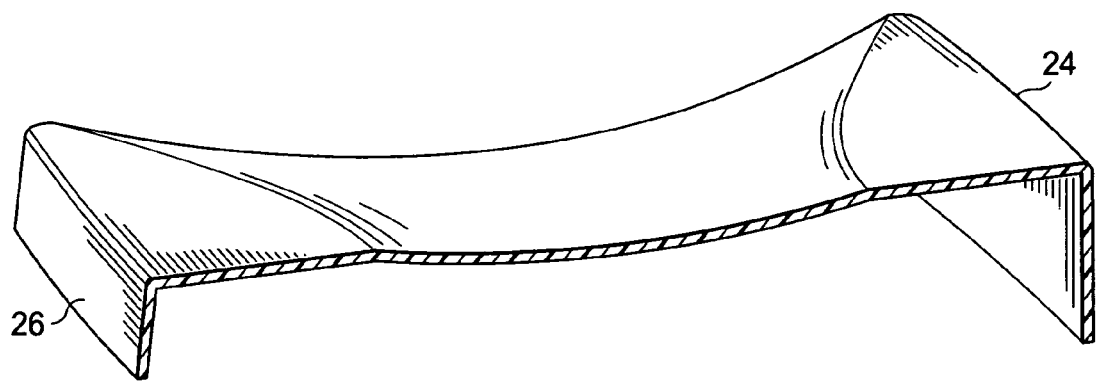
FIG. 6 shows a cross-section taken along line 2-2 in FIG. 4.

Referring now to FIG. 4 of the Figures, there is shown another preferred embodiment of the present invention at 20. FIG. 5 shows a cross-section of the invention of FIG. 4 taken along line 1-1 in a longitudinal direction, and FIG. 6 shows a cross-section taken in the lateral direction along line 2-2 in FIG. 4. As shown in FIG. 5, section 1-1, a recessed surface 22 portion extending between opposing ends 24 and 26 of the notebook stand is curved outwardly in the longitudinal direction, as shown in section 1-1, and curved inwardly in the lateral direction, as shown in section 2-2. Advantageously, this embodiment shows notebook stand 20 having one end 24 rising higher than the other end 26 to angle the notebook computer (not shown) with respect to the surface it rests upon. In addition, the midsection surface area of the notebook stand forms a recessed portion formed as a saddle, providing a cooling space beneath the bottom surface of the notebook computer, providing structural integrity, and also an aesthetically pleasing design.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A notebook/laptop computer stand for supporting a notebook/laptop computer, comprising
a support member having a first support portion and a second support portion each extending upwardly and configured to support the notebook/laptop computer, the support member further comprising a recessed portion disposed between the first support portion and second support portion and having a curved major surface bowing upwardly between the first support portion and the second support portion, wherein the curved major surface is configured as a saddle along a first axis, and also configured as a saddle along a second axis transverse to the first axis.

2. The notebook/laptop computer stand as specified in claim 1 wherein the curved major surface is convex.

3. The notebook/laptop computer stand as specified in claim 1 wherein the first support portion is shorter than the second support portion.

4. The notebook/laptop computer stand as specified in claim 1 wherein the notebook/laptop computer stand is formed as a unitary member.

5. A notebook/laptop computer stand for supporting a notebook/laptop computer, comprising
a support member having a first support portion and a second support portion each extending upwardly and configured to support the notebook/laptop computer, the support member further comprising a recessed portion disposed between the first support portion and second support portion and having a curved major surface bowing upwardly between the first support portion and the second support portion, wherein the support member includes a base having a bottom surface, wherein the curved major surface extends from a first surface end to a second surface end, wherein the first surface end is closer to the bottom surface than the second surface end.

6. The notebook/laptop computer stand as specified in claim 5 wherein the second support portion extends higher than the first support portion.

7. A notebook/laptop computer stand for supporting a notebook/laptop computer, comprising
a support member having a first support portion and a second support portion each extending upwardly and configured to support the notebook/laptop computer, the support member further comprising a recessed portion disposed between the first support portion and second support portion and having a curved major surface bowing upwardly between the first support portion and the second support portion, wherein the support member includes a base having a bottom surface, wherein the curved major surface is convex along a first axis, and concave along a second axis transverse to the first axis.

8. The notebook/laptop computer stand as specified in claim 7 wherein the first support portion forms a first support surface, and the second support portion forms a second surface.

9. The notebook/laptop computer stand as specified in claim 8 wherein one of the support surfaces has a curved edge portion extending toward the recessed portion.

10. The notebook/laptop computer stand as specified in claim 8 wherein both the support surfaces have a curved edge extending toward the recessed portion.

11. In combination:
a notebook/laptop computer; and
a stand, comprising:
a support member having a first support portion and second support portion each extending upwardly and configured to support the notebook/laptop computer, the support member further comprising a recessed portion disposed between the first support portion and second support portion and having a curved major surface bowing upwardly toward the notebook/laptop computer between the first support portion and the second support portion, wherein the curved major surface is configured as a saddle along a first axis, and also configured as a saddle along a second axis transverse to the first axis.

12. The combination as specified in claim 11 wherein the curved major surface is convex.

13. The combination as specified in claim 11 wherein the first support portion is shorter than the second support portion.

14. The combination as specified in claim 11 wherein the notebook/laptop computer stand is formed as a unitary member.

15. In combination:
a notebook/laptop computer; and
a stand, comprising:
a support member having a first support portion and second support portion each extending upwardly and configured to support the notebook/laptop computer, the support member further comprising a recessed portion disposed between the first support portion and second support portion and having a curved major surface bowing upwardly toward the notebook/laptop computer between the first support portion and the second support portion, wherein the support member includes a base having a bottom surface, wherein the curved major surface extends from a first surface end to a second surface end, wherein the first surface end is closer to the bottom surface than the second surface end.

16. The combination as specified in claim 15 wherein the second support portion extends higher than the first support portion.

17. In combination:
a notebook/laptop computer; and
a stand, comprising:
a support member having a first support portion and second support portion each extending upwardly and configured to support the notebook/laptop computer, the support member further comprising a recessed portion disposed between the first support portion and second support portion and having a curved major surface bowing upwardly toward the notebook/laptop computer between the first support portion and the second support portion, wherein the curved major surface is convex along a first axis, and concave along a second axis transverse to the first.

18. The combination as specified in claim 17 wherein the first support portion forms a first support surface, and the second support portion forms a second surface.

19. The combination as specified in claim 18 wherein one of the support surfaces has a curved edge portion extending toward the recessed portion.

20. The combination as specified in claim 18 wherein both the support surfaces have a curved edge extending toward the recessed portion.

* * * * *